G. W. ISLEY.
VALVE.
APPLICATION FILED NOV. 9, 1914.
1,155,576.
Patented Oct. 5, 1915.
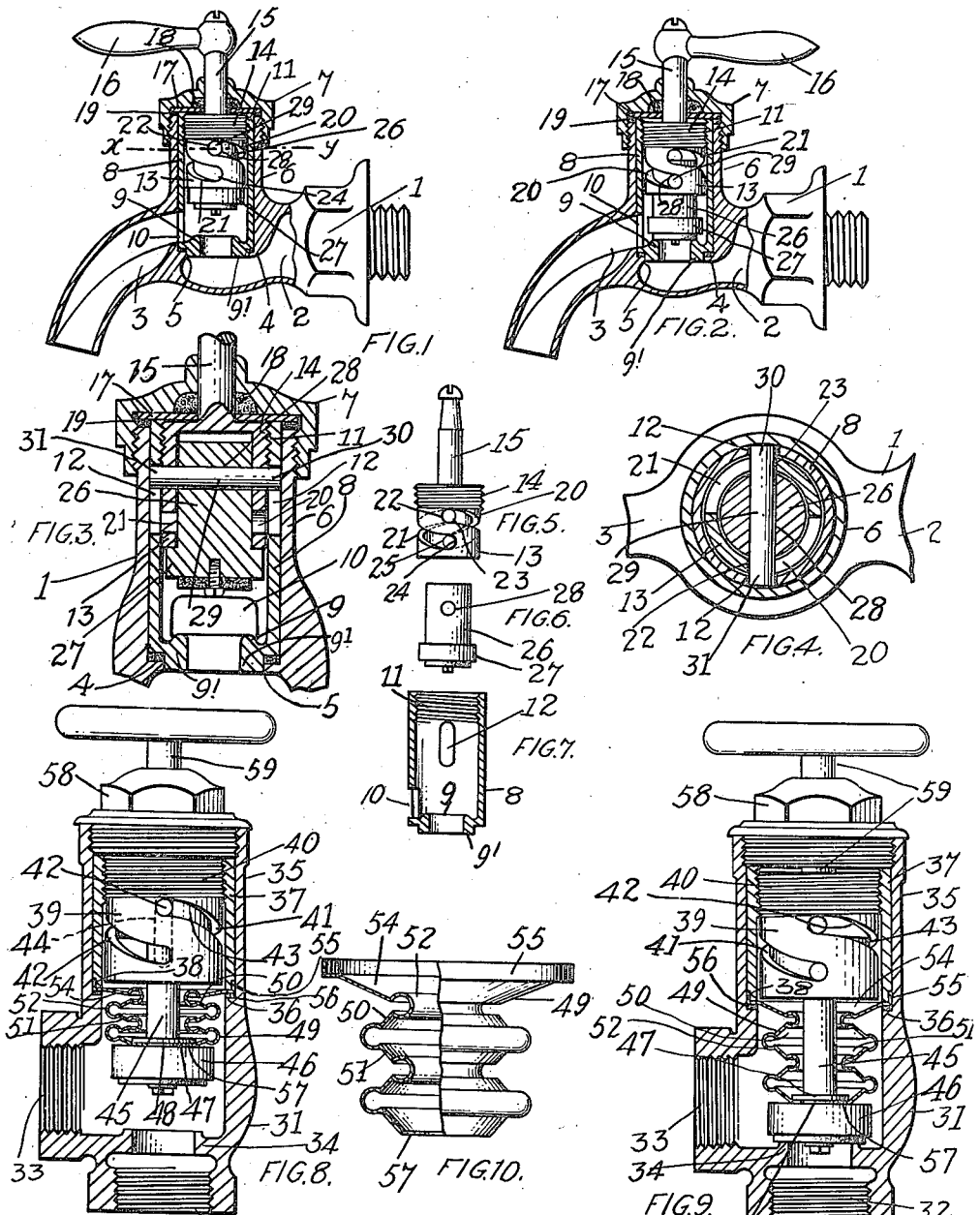
WITNESSES
INVENTOR.
GILBERT. W. ISLEY
by Fetherstonhaugh & Co
attys

UNITED STATES PATENT OFFICE.

GILBERT WILLIAM ISLEY, OF TORONTO, ONTARIO, CANADA.

VALVE.

1,155,576.

Specification of Letters Patent.

Patented Oct. 5, 1915.

Application filed November 9, 1914. Serial No. 871,091.

*To all whom it may concern:*

Be it known that I, GILBERT WILLIAM ISLEY, of the city of Toronto, in the county of York, in the Province of Ontario, Canada, have invented certain new and useful Improvements in Valves, of which the following is the specification.

My invention relates to improvements in valves and the object of the invention is to devise a simple, quick operating valve, the parts of which may be readily withdrawn for the purpose of repair and it consists essentially of an outer cylindrical member having vertical slots therein, an inner cylindrical member threaded into the outer member and provided with a pair of spiral slots extending circumferentially in opposite directions, an operating stem formed integral with the inner cylindrical member, a solid cylindrical portion fitting within the inner cylindrical member and carrying a valve head at its lower end, a cross pin extending through such solid cylindrical portion and projecting therefrom at its ends, the projecting ends of the pin extending through the spiral slots of the inner cylindrical member and the vertical slots of the outer cylindrical member as hereinafter more particularly explained by the following specification.

Figure 1, is a sectional view of a tap showing my valve applied thereto, the valve being shown in the open position. Fig. 2, is a similar view to Fig. 1 showing the valve in the closed position. Fig. 3, is an enlarged vertical section through the valve and adjacent parts taken at right angles to the section shown in Fig. 1. Fig. 4, is an enlarged plan section on line *x—y* Fig. 1. Figs. 5, 6 and 7 are detail views of the valve parts. Fig. 8, is a sectional view showing my valve employed as an angle valve, the valve being in the open position in this figure. Fig. 9, is a similar view to Fig. 8 showing the valve in the closed position. Fig. 10, is a detail view of the metallic packing employed in connection with my valve as shown in Figs. 8 and 9.

In the drawings like letters of reference indicate corresponding parts in each figure.

I will first refer to Figs. 1 to 7. 1 is a tap body of any usual form provided with the inlet portion 2 and outlet portion 3 divided by the horizontal web 4 having an orifice 5 in which the valve seat is supported. The tap body is provided with the usual upwardly extending cylindrical portion 6 provided with a cap 7 threaded thereon. 8 is an outer cylindrical member of the valve provided with a valve seat portion 9 having a reduced portion 9' at its lower end formed integral therewith and fitting within the orifice 5. 10 is a peripheral opening formed in the cylindrical member 8 and registering with the outlet portion 3 of the tap. The upper end of the cylindrical member 8 is provided with an internally threaded portion 11. 12 are vertical slots formed in the wall of the cylindrical member 8 in opposite sides of the member. 13 is an inner cylindrical member provided at its upper end with a threaded portion 14 designed to engage with the internally threaded portion 11 of the cylindrical member 8. 15 is an operating stem formed integral with the cylindrical member 13 and to which is secured the usual operating handle 16. 17 is a metallic washer fitting within the cap 7. 18 and 19 are suitable packings. The packing 18 is inserted around the valve stem and the packing 19 between the washer and upper end of the cylindrical portion 6. 20 and 21 are spiral slots formed in the cylindrical member 13. The upper portions of slots 20 and 21 extend spirally in opposite directions from one side to the other of the member 13 as particularly shown in Fig. 5 of the drawings. In this figure it will be seen that the semi-circular upper end 22 of the slot 20 located on one side of the member 13 opposes the semi-circular upper end 23 of the slot 21 located on the opposite side of the member 13 and similarly the semi-circular lower end 24 of the slot 21 opposes the semi-circular lower end 25 of the slot 20. 26 is a solid cylindrical portion. 27 is a valve head secured to or formed integral with the solid cylindrical portion 26. 28 is an orifice extending diametrically through the cylindrical portion 26. 29 is a pin which is driven into the orifice 28 so as to project outwardly from each side of the cylindrical portion 26 into and through the spiral slots 20 and 21 and vertical slots 12.

It will thus be seen that on one side of the valve the semi-circular end 23 of the slot 20 bears against one side of the prrojecting portion 30 of the pin 29 and the semi-circular end 22 of the slot 20 bears against the opposite side of the projecting portion 31 of the pin 29 when the valve is in the open position (see Fig. 4). When the valve is in the closed position as shown in Fig. 2 the cylindrical member 13 is turned a half turn by means of the operating handle 16 so that the projecting ends 30 and 31 of the pin are carried vertically downward in the slots 12 by means of the cam action of the spiral slots 20 and 21 until the semi-circular end 24 bears against one side of the pin at one end and the semi-circular portion 25 bears against the opposite side of the pin at the opposite end. When the operating handle 16 of the valve is turned so as to turn the stem 15 and cylindrical member 13 the thread 14 is screwed upward or downward in the thread 11 to allow of the movement hereinbefore described.

In Figs. 8 and 9 I show an angle member such as is employed in steam radiator systems. In these figures 31 is the body of the angle member provided with inlets and outlets 32 and 33 and the valve seat portion 34. 35 is a cylindrical portion extending upwardly from the angle provided with an internal shoulder 36. 37 is a cylindrical member fitting within the cylindrical portion 35 and provided with a slightly reduced lower end 38. 39 is a cylindrical member provided with a threaded upper end 40 and spiral slots 41 and 42 similar to those described in connection with the cylindrical member 13 shown in Figs. 1, 2 and 5. 43 is a solid cylindrical portion slidably held within the cylindrical member 39 and through which extends a pin 42, the projecting ends of the pin extending through the slots 41 and 42 of the cylindrical member 39 and into the vertical slots 44 in the cylindrical member 37 and corresponding to the slots 12 in Figs. 3 and 7. 45 is a valve stem to which is suitably secured the valve head 46 having an upwardly extending reduced portion 47 having an annular groove 48 formed therein. 49 is a metallic packing shown in detail in Fig. 10. The packing 49 comprises a series of opposing cone-frustum shaped portions 50 and 51 connected together by annular portions 52 of circular form in cross section. The upper cone-frustum shaped portion 54 is slightly larger than the cone-frustum shaped portions 50 and 51 and is provided with an upwardly extending annular flange 55 which fits around the reduced portion 38 of the cylindrical member 37 and rests upon suitable packing 56 carried by the shoulder 36. The lower end of the metallic packing 49 is provided with an inwardly extending annular portion 57 fitting into the groove 48 hereinbefore described. 58 is a closing cap screwed into the upper end of the cylindrical portion 35. 59 is the operating stem of the valve.

It will be understood that the packing 49 is formed of spring metal and that when the valve is opened the circular portions 52 contract and allow the cone-frustum shaped portions 50 and 51 to be carried together. When the valve is opened the portions 52 expand carrying the portions 50 and 51 apart thereby maintaining a steam tight joint between the valve head and the cylindrical portion 37. The operation of the valve as shown in Figs. 8 and 9 is identical with that of the valve shown in Figs. 1 and 2 and it, therefore, need not be described in detail.

From this description it will be seen that I have devised a very simple form of valve which will be quick operating, simple in construction and may easily be withdrawn for the purpose of repair.

What I claim as my invention is:

1. A valve comprising an outer cylindrical member having vertical opposing slots therein and an internal thread at its upper end, an inner cylindrical member having an external thread at its upper end engaging with the internal thread of the aforesaid member and having circumferential spiral slots extending respectively from opposite sides of such member in opposite directions, a solid cylindrical member slidably held within the aforesaid inner cylindrical member, a valve head carried thereby, and projecting portions extending from the solid cylindrical member at diametrically opposite sides thereof into the spiral slots of the inner cylindrical member and vertical slots of the outer cylindrical member, and an operating valve stem extending upwardly from the inner cylindrical member, as and for the purpose specified.

2. In a valve, the combination with the valve casing having a suitable valve seat and the usual outlet and inlet orifices, of a cylindrical member fitting within the valve body and having longitudinal diametrically opposing slots therein and having an internal threaded upper end, a closing cap suitably secured on to the valve body and against the upper end of the outer cylindrical member, an inner cylindrical member having an externally threaded upper end engaging the internal thread of the outer cylindrical member and having spiral slots extending circumferentially in opposite directions from opposite sides of the inner cylindrical member, a solid cylindrical portion fitting within the inner cylindrical member, a valve head carried thereby, a cross pin extending through the solid cylindrical member and projecting at its ends into the spiral slots of the inner cylindrical member and vertical slots of the outer cylindrical member, and an operating stem extending from the inner cylindrical member through the closing cap of the valve, as and for the purpose specified.

GILBERT WILLIAM ISLEY.

Witnesses:
   E. PENNOLK,
   M. EGAN.